(12) United States Patent
Kaneko et al.

(10) Patent No.: US 10,660,351 B2
(45) Date of Patent: *May 26, 2020

(54) BEVERAGE CONTAINING AQUEOUS MEDIUM EXTRACT OF HOP SUBJECTED TO OXIDATION TREATMENT

(71) Applicant: Kirin Holdings Kabushiki Kaisha, Nakano-Ku, Tokyo (JP)

(72) Inventors: Yuji Kaneko, Tokyo (JP); Fumitoshi Manabe, Tokyo (JP); Yoshimasa Taniguchi, Tokyo (JP); Mikio Katayama, Tokyo (JP)

(73) Assignee: Kirin Holdings Kabushiki Kaisha, Tokyo (JP)

( * ) Notice: Subject to any disclaimer, the term of this patent is extended or adjusted under 35 U.S.C. 154(b) by 143 days.

This patent is subject to a terminal disclaimer.

(21) Appl. No.: 14/409,591

(22) PCT Filed: Jun. 20, 2013

(86) PCT No.: PCT/JP2013/066994
§ 371 (c)(1),
(2) Date: May 18, 2015

(87) PCT Pub. No.: WO2013/191258
PCT Pub. Date: Dec. 27, 2013

(65) Prior Publication Data
US 2015/0245649 A1    Sep. 3, 2015

(30) Foreign Application Priority Data

Jun. 20, 2012 (JP) .................................. 2012-139219

(51) Int. Cl.
*A23L 2/56* (2006.01)
*C12C 3/00* (2006.01)
*C12C 13/00* (2006.01)

(52) U.S. Cl.
CPC .................. *A23L 2/56* (2013.01); *C12C 3/00* (2013.01); *C12C 13/00* (2013.01); *A23V 2002/00* (2013.01)

(58) Field of Classification Search
CPC ................ A23L 2/54; C12C 3/12; C12C 3/00
See application file for complete search history.

(56) References Cited

U.S. PATENT DOCUMENTS 4,160,787 A * 7/1979 Moll ........................ C12C 5/026
568/341
4,780,330 A * 10/1988 Laws ........................ C12C 3/06
426/448

(Continued)

FOREIGN PATENT DOCUMENTS

EP    2653041 A1    10/2013
JP    50-70512    6/1975

(Continued)

OTHER PUBLICATIONS

Analysis of Hop Acids and Their Oxidized Derivatives and Iso-r-acids in Beer by Capillary Electrophoresis_Electrospray Ionization Mass Spectrometry, J. Agric. Food Chem. 2006, 54, 5400-5409.*

(Continued)

*Primary Examiner* — Tamra L. Dicus
(74) *Attorney, Agent, or Firm* — Foley & Lardner LLP

(57) ABSTRACT

The invention is related to a beverage having an improved flavor. More precisely, it is related to a beverage having an improved flavor, comprising an aqueous medium extract of a hop having been subjected to an oxidation treatment.

3 Claims, 5 Drawing Sheets

(56) References Cited

U.S. PATENT DOCUMENTS

| | | | | |
|---|---|---|---|---|
| 4,839,189 | A | * | 6/1989 | Forrest ................... C12C 3/10 426/520 |
| 4,946,691 | A | * | 8/1990 | Burkhardt ............... C12C 3/04 426/600 |
| 6,020,019 | A | * | 2/2000 | Ting ....................... C12C 3/10 426/600 |
| 2006/0233902 | A1 | * | 10/2006 | Yajima ................. A61K 31/122 424/778 |
| 2009/0186142 | A1 | * | 7/2009 | Tatewaki .............. A61K 9/0056 426/590 |
| 2010/0166926 | A1 | * | 7/2010 | Jerkovic ................. A23L 2/52 426/271 |
| 2011/0288335 | A1 | * | 11/2011 | Ting ..................... A61K 31/122 564/303 |
| 2012/0270950 | A1 | * | 10/2012 | Taniguchi ............ A61K 31/122 514/690 |
| 2013/0316023 | A1 | * | 11/2013 | Manabe ................ A61K 36/185 424/725 |
| 2013/0316068 | A1 | * | 11/2013 | Taniguchi ............ A61K 36/185 426/590 |

FOREIGN PATENT DOCUMENTS

| | | |
|---|---|---|
| JP | 59-059623 A | 4/1984 |
| JP | 61-001374 A | 1/1986 |
| JP | 2001-131080 A | 5/2001 |
| JP | 2001-321166 A | 11/2001 |
| JP | 2007-089439 A | 4/2007 |
| JP | 2008-136367 A | 6/2008 |
| JP | 2008-212041 A | 9/2008 |
| JP | 2008212041 A * | 9/2008 |
| JP | 2008-228634 A | 10/2008 |
| JP | 2010-268774 A | 12/2010 |
| JP | 2011-083266 A | 4/2011 |
| WO | WO 03/068205 A1 | 8/2003 |
| WO | WO 2009/050905 A1 | 4/2009 |
| WO | WO 2010/143719 A1 | 12/2010 |
| WO | WO 2012/081675 A1 | 6/2012 |
| WO | WO 2012/081676 A1 | 6/2012 |

OTHER PUBLICATIONS

Tricyclooxyisohumulon, ein neues Autoxidationsprodukt des Humulons, by KonradWärtgen1 and Max Wichtl1.2, 1 Institute for Pharmaceutical Biology of the Philipps University, D-3550 Marburg, Federal Republic of Germany 2 Correspondence address, pp. 1-2.*

Tricyclooxyisohumulone: A New Autoxidation Product of Humulone, by KonradWärtgen1 and Max Wichtl1.2, 1 Institute for Pharmaceutical Biology of the Philipps University, D-3550 Marburg, Federal Republic of Germany 2 Correspondence address, pp. 1-13.*

DeClerck, Jean, Prof., "The Process of Wort Boiling," The Brewers Digest, Mar. 1967, 42(3):96-99.

Garcia-Villalba et al., "Analysis of Hop Acids and Their Oxidized Derivatives and Iso-α-acids in Beer by Capillary Electrophoresis—Electrospray Ionization Mass Spectrometry," J. Agric. Food Chem., 2006, 54:5400-5409.

Intelmann et al., "On the Autoxidation of Bitter-Tasting Iso-α-acids in Beer," J. Agric. Food Chem., 2010, 58:5059-5067.

Lam et al., "Aging of Hops and Their Contribution to Beer Flavor," J. Agric., Food Chem., 1986, 34(4):763-770.

Peacock, V., "Fundamentals of Hop Chemistry," Technical Quarterly—Master Brewers Association of the Americas, 1998, 35(1):4-8.

Srecec et al., "Hop Pellets Type 90: Influence of Manufacture and Storage on Losses of α-Acids:" Acta Alimentaria, 2009, 38(1):141-147.

Taniguchi et al., "Identification and Quantification of the Oxidation Products Derived from α-Acids and β-Acids During Storage of Hops (*Humulus lupulus* L.)," J. Agric. Food Chem., Epub Mar. 7, 2013, 61(12):3121-3130.

Verzele et al., "High Performance Liquid Chromatography Analysis of Colupulone Oxidation Products in Hops and in Beer," Journal of the American Society of Brewing Chemists, 1983, 41(2):57-60.

Wartgen et al., "Tricyclooxyisohumulone: A New Autoxidation Product of Humulone," Planta Medica, 1991, 57(5):498-499.

Supplementary Partial European Search Report dated May 23, 2016, in EP 13806158.5.

Ashurst et al., "Further Studies on the Oxidation of Hop Resins," Journal of the Institute of Brewing, Nov. 12, 1966, 72(6):561-569.

Intelmann et al., "On the Autoxidation of Bitter-Tasting Iso-α-acids in Beer," Journal of Agricultural and Food Chemistry, Apr. 28, 2010, 58(8):5059-5067.

Yajima et al., "Prevention of diet-induced obesity by dietary isomerized hop extract containing isohumulones, in rodents," International Journal of Obesity, Aug. 1, 2005, 29(8):991-997.

International Search Report dated Oct. 1, 2013, in PCT/JP2013/066994.

Australian Office Action dated Jun. 8, 2016, in AU 2013278296.

Office Action dated Feb. 7, 2017, in JP 2014-521513, with English translation.

Office Action dated Jun. 2, 2017, in JP 2014-521513, with English translation.

* cited by examiner

BEVERAGE CONTAINING AQUEOUS MEDIUM EXTRACT OF HOP SUBJECTED TO OXIDATION TREATMENT

CROSS-REFERENCE TO RELATED APPLICATIONS

This application is the U.S. National Stage of PCT/JP2013/066994, filed Jun. 20, 2013, which is based upon and claims the benefit of priority from Japanese Patent Application No. 2012-139219, filed on Jun. 20, 2012; the entire contents of which are incorporated herein by reference.

BACKGROUND OF THE INVENTION

Hop is a moraceous perennial plant (scientific name: *Humulus lupulus*) native to Europe, and a berry cone (ripe female flower) of the same is generally called as hop and well known by reason of use for imparting bitterness and aroma to beer, and has been ingested for many years. The bitterness and aroma are originated from a lupulin part of a hop (a yellow granule formed at a root of an inner glume of a berry cone). A hop has been also used as a folk medicine, and as the effects a tranquilizing effect, a quick and sound sleep effect, an appetite stimulation, a stomachic action, a diuretic action, and an antidiabetic action are reported in Japanese Unexamined Patent Application Publication No. S50-70512 (Patent Literature 1), and Japanese Unexamined Patent Application Publication No. S59-59623 (Patent Literature 2).

Recently, with respect to polyphenols originated from a hop glume, which is a hop berry cone excluding a lupulin part, a lipase inhibitory action, a body weight increase suppression action, etc. are reported in Japanese Unexamined Patent Application Publication No. 2001-321166 (Patent Literature 3), Japanese Unexamined Patent Application Publication No. 2001-131080 (Patent Literature 4), etc. As described above, a hop has a variety of health-related functions, on the other hand a hop contains a large number of bittering components, such as α acids and iso-α acids as represented by humulones and isohumulones, and is very difficult to be ingested pleasantly.

Japanese Unexamined Patent Application Publication No. 2008-212041 (Patent Literature 5) has reported that α acids, iso-α acids, etc. can be oxidatively decomposed by oxidatively ripening a hop, so that bitterness can be mitigated.

Meanwhile, many kinds of pleasure beverages filled in a container, such as a can, and a PET bottle, have been developed recently, and also commercially supplied. It is important to impart a flavor which creates a feeling of briskness, richness, luxuriousness, etc. to a pleasure beverage, in order to stimulate consumption. However, if an additive for imparting a flavor is added to a beverage, the original taste of the beverage is impaired frequently. Therefore, methods for imparting a favorable flavor to a beverage without impairing the taste of the beverage have been heretofore investigated.

For example, Japanese Unexamined Patent Application Publication No. 2010-268774 (Patent Literature 6) describes that powders of a water extract of roasted barley and/or adlay, and a water extract of a herb are added to a beverage in order to improve the palatability by improving an unpleasant aftertaste of a beverage containing barley tea filled in a container without impairing the original taste of the beverage containing barley tea.

Further, Japanese Unexamined Patent Application Publication No. 2008-136367 (Patent Literature 7) describes that a tea drink having an excellent flavor suppressing an odor, bitterness, and astringency derived from polyphenols can be provided by adding an extract component of tea leaves including roasted tea leaves, and α-cyclodextrin to a tea drink containing polyphenols at a high concentration, owing to a synergistic effect of a roast aroma of roasted tea and a masking action of α-cyclodextrin.

A hop is sometimes utilized for imparting a good quality taste and aroma as in the case of beer. Japanese Unexamined Patent Application Publication No. 2011-83266 (Patent Literature 8) reports that hop tea was produced using branches and leaves, berry cones, etc. of a hop as source materials. However, because of a unique intensive bitterness, when a hop is added to a beverage such as tea with only limited original bitterness, the taste is impaired.

As described above, in the case of a beverage type which undergoes a wort boiling step or a low temperature ripening step purposed to remove an unpleasant odor (off-flavor), the unpleasant odor can be removed, however, when a hop was utilized in a beverage such as a soft drink, like tea or soda, which does not undergo a step for removing an off-flavor in the production method, the original taste of the beverage was impaired.

CITATION LIST

Patent Literature

[Patent Literature 1] Japanese Unexamined Patent Application Publication No. S50-70512
[Patent Literature 2] Japanese Unexamined Patent Application Publication No. S59-59623
[Patent Literature 3] Japanese Unexamined Patent Application Publication No. 2001-321166
[Patent Literature 4] Japanese Unexamined Patent Application Publication No. 2001-131080
[Patent Literature 5] Japanese Unexamined Patent Application Publication No. 2008-212041
[Patent Literature 6] Japanese Unexamined Patent Application Publication No. 2010-268774
[Patent Literature 7] Japanese Unexamined Patent Application Publication No. 2008-136367
[Patent Literature 8] Japanese Unexamined Patent Application Publication No. 2011-83266

SUMMARY OF THE INVENTION

After diligent investigations, the inventors discovered that the flavor of a beverage can be improved effectively without impairing the original taste of a beverage by using an aqueous medium extract of a hop subjected to an oxidation treatment. The present invention is based on the above knowledge.

Therefore, an object of the present invention is to provide a beverage containing an aqueous medium extract of a hop, which has been subjected to an oxidation treatment, having a flavor improving action.

The present invention provides the following inventions.
(1) A beverage having an improved flavor, comprising an aqueous medium extract of a hop having been subjected to an oxidation treatment.
(2) The beverage according to (1), wherein the percentage of a peak area of an iso-α acid, an α acid, and a β acid to the total peak area in a HPLC analysis of an oxidation reaction product of a hop obtained by the oxidation treatment is 20% or less.

(3) The beverage according to (1) or (2), wherein the aqueous medium extract is subjected to an odor removal treatment.

(4) The beverage according to any one of (1) to (3), wherein the total content of tricyclooxyisocohumulone, tricyclooxyisohumulone, and tricyclooxyisoadhumulone in the beverage is from 0.00825 to 44 ppm.

(5) A method for producing a beverage having an improved flavor, comprising a step for adding an aqueous medium extract of a hop having been subjected to an oxidation treatment to a beverage.

(6) The method according to (5), further comprising a step for performing an odor removal treatment on the aqueous medium extract or a beverage comprising the same.

(7) The method according to (5) or (6), wherein the total content of tricyclooxyisocohumulone, tricyclooxyisohumulone, and tricyclooxyisoadhumulone in a beverage is from 0.00825 to 44 ppm.

(8) A method for improving the flavor of a beverage, comprising a step for adding an aqueous medium extract of a hop having been subjected to an oxidation treatment to a beverage. beverage.

(9) The method according to (6), further comprising a step for performing an odor removal treatment on the aqueous medium extract or a beverage comprising the same.

(10) A method for producing a flavor improving agent comprising a step for extracting a hop having been subjected to an oxidation treatment with an aqueous medium.

(11) The method according to (10), further comprising a step for performing an odor removal treatment on the aqueous medium extract.

(12) A flavor improving agent for a beverage comprising an aqueous medium extract of a hop having been subjected to an oxidation treatment as an active ingredient.

(13) The flavor improving agent according to (12), having been subjected to an odor removal treatment.

(14) A use of an aqueous medium extract of a hop having been subjected to an oxidation treatment as a flavor improving agent for a beverage.

(15) The use according to (14), wherein the aqueous medium extract has been subjected to an odor removal treatment.

(16) The use according to (14) or (15), wherein the total content of tricyclooxyisocohumulone, tricyclooxyisohumulone, and tricyclooxyisoadhumulone in a beverage is from 0.00825 to 44 ppm.

According to the invention the flavor of a beverage can be improved effectively.

DETAILED DESCRIPTION OF THE INVENTION

Oxidation Reaction Product of Hop

Figure 1A:
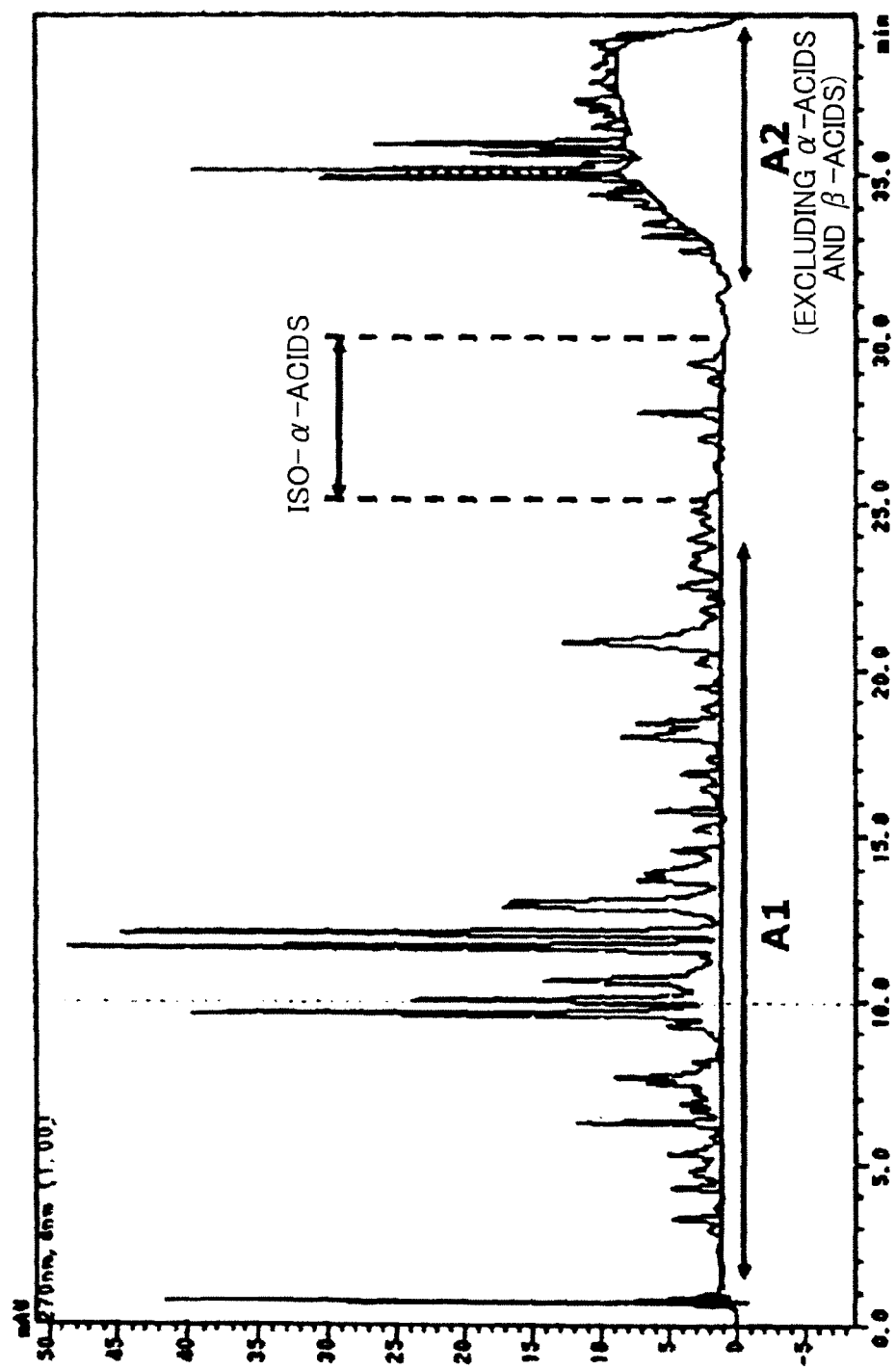
FIG. 1A is a HPLC chart of a product obtained by an oxidation treatment of a hop (Example 1).

An oxidation reaction product of a hop provided by the present invention can be obtained through an oxidation treatment by making a hop in contact with oxygen in the air. Although there is no particular restriction on an oxidation treatment according to the present invention, from a viewpoint of oxidation efficiency, the oxidation treatment may be conducted preferably at from 60° C. to 80° C., and for from 8 hours to 120 hours. The technique for an oxidation treatment will be described below. A hop according to the present invention may be in any optional form insofar as a lupulin part is included; and a harvested product before drying, a harvested and dried product, a compressed product, a ground product, and a pelletized product may be used. Further, a pellet of a selectively concentrated lupulin part may be also used. Furthermore, a pellet having been subjected to an isomerization treatment may be also used.

A hop contains an acidic resin component, such as α acids (humulones), β acids (lupulones), and iso-α acids (isohumulones). "Humulones" means according to the present invention to include humulone, adhumulone, cohumulone, posthumulone, and prehumulone. Meanwhile, "Lupulones" means according to the present invention to include lupulone, adlupulone, colupulone, postlupulone, and prelupulone. Further, "isohumulones" means according to the present invention to include isohumulone, isoadhumulone, isocohumulone, isoposthumulone, isoprehumulone, Rho-isohumulone, Rho-isoadhumulone, Rho-isocohumulone, Rho-isoposthumulone, Rho-isoprehumulone, tetrahydro-isohumulone, tetrahydro-isoadhumulone, tetrahydro-isocohumulone, tetrahydro-isoprehumulone, tetrahydro-isoposthumulone, hexahydro-isohumulone, hexa hydro-isoadhumulone, hexahydro-isocohumulone, hexa hydro-isoposthumulone, and hexahydro-isoprehumulone. Although there are cis and trans stereoisomers in isohumulones, which are understood to include both of them, unless otherwise specified.

According to Examples described below, if a hop is subjected to an oxidation treatment, the contents of an α acid, a β acid, and an iso-α acid are reduced, and the contents of other components are increased. Therefore, examples of an "oxidation reaction product of a hop", which is obtained by conducting an oxidation treatment on a hop, include oxidation reaction products, in which the percentage of a peak area of an iso-α acid, an α acid, and a β acid to the total HPLC peak area, when a HPLC analysis is conducted similarly as in Example 1, is preferably 20% or less, more preferably 10% or less, and further preferably 5% or less.

Components contained in an oxidation reaction product according to the present invention other than an α acid, a β acid, and an iso-α acid can be easily detected by a well known analysis means such as HPLC. For example, in a hop having been subjected to an oxidation treatment prepared by a procedure described in Example 1, a compound other than an α acid, a β acid, and an iso-α acid is contained. Therefore, examples of an oxidation reaction product according to the present invention include oxidation reaction products, in which the percentage of a peak area of a component other than an α acid, α acid, and an iso-α acid, to the total HPLC peak area, when a HPLC analysis according to Example 1 is conducted, is preferably 80% or more, more preferably 90% or more, and further preferably 95% or more.

According to a more specific aspect, a component other than an α acid, a β acid, and an iso-α acid in an oxidation reaction product of a hop shows a characteristic peak at least near a retention time of 9.7 min, near a retention time of 11.8 min, and near a retention time 12.3 min, when an analysis is made under similar HPLC conditions as in Example 1. In this regard, "near" means in terms of a retention time preferably a measurement error of ±0.2 min.

Oxidation Treatment

An oxidation reaction product according to the present invention can be produced by performing an oxidation treatment on a hop. An oxidation treatment is preferably performed by heating a hop in the air. Although there is no particular restriction on the heating temperature, a preferable upper limit is 100° C., and a more preferable upper limit is 80° C. If the heating temperature is 100° C. or less, it is advantageous to advance oxidation preferentially rather than isomerization. Meanwhile, a preferable lower limit of the heating temperature is 60° C. If the heating temperature is 60° C. or more, it is advantageous to advance an oxidation reaction efficiently. Also there is no particular restriction on the reaction time, and it may be decided appropriately according to the kind of hop, or the reaction temperature. For example, if it is 60° C., 48 to 120 hours is preferable, and if it is 80° C., 8 to 24 hours is preferable. Further, although there is no particular restriction on the form of a hop, insofar as good contact with oxygen is available, it is preferably a powdery form so as to shorten the reaction time. Storage in a high humidity environment is allowed.

By an oxidation treatment, an α acid, a β acid, and an iso-α acid contained in a hop can be changed to oxidized substances. The degree of oxidation of these components can be examined by an analysis with the HPLC, etc.

A hop to be subjected to an oxidation treatment is commercially supplied as an additive to beer, and a commercial product can be used according to the present invention. For example, hop cones compressed to a pellet form (Type 90 pellet), a pellet in which a lupulin part is selectively concentrated (Type 45 pellet), or a pellet of a hop having been subjected to an isomerization treatment (for example, Isomerized Pellets (Hopsteiner)) may be used.

Extraction Treatment

An aqueous medium extract of a hop subjected to an oxidation treatment, which is equivalent to an oxidation reaction product of a hop according to the present invention, can be obtained by extracting a hop subjected to the afore-described oxidation treatment with an aqueous medium. The extracting step with an aqueous medium is preferable from a viewpoint of reduction of bitterness of an oxidation reaction product of a hop.

An extracting step according to the present invention can be performed by a publicly known technique, for example, by dipping and mixing a hop having been subjected to an oxidation treatment, or an oxidation reaction product of the hop in an aqueous medium for a certain time period.

Preferable examples of an aqueous medium according to the present invention include water, an aqueous beverage (tea, coffee, wort, fruit juice, etc.), distilled water, an inorganic salt aqueous solution, and various buffer solutions; preferably water and an aqueous beverage, and more preferably water and tea. In a case where such an aqueous medium based on water is used, a removing step for an organic solvent becomes dispensable, which is advantageous for beverage production. Extraction may be performed simultaneously with other source materials (tea leaves, coffee, and grains).

Although there is no particular restriction on the pH of an aqueous medium according to the present invention, it is preferably neutral or acidic, and more preferable pH is approx. from 4 to 7. Extraction in a neutral or acidic region is preferable from a viewpoint of reduction of bitterness and an unpleasant odor of an oxidation reaction product of a hop.

There is no particular restriction on the extraction temperature with an aqueous medium according to the present invention, and it may be adjusted appropriately according to the pH of an aqueous medium, the extraction time, or an amount of a hop subjected to an oxidation treatment, and is preferably from 20 to 75° C., more preferably from 20 to 60° C. An extraction treatment at such a low temperature is preferable from a viewpoint of reduction of bitterness and an unpleasant odor.

Although there is no particular restriction on the extraction time of a hop subjected to an oxidation treatment, a short time is preferable. Specifically, the extraction time is preferably from 0.5 to 10 min, and more preferably from 0.5 to 5 min. If extraction is conducted in such a short time, bitterness and an unpleasant odor can be reduced actually even better, which is an unexpected finding.

The total concentration of oxidized substances of an α acid, oxidized substances of an iso-α acid, and oxidized substances of a β acid of an oxidation reaction product of a hop in an aqueous medium extract (preferably water extract) of an oxidation reaction product of a hop is, for example, from 1 to 80 w/w % by dry weight, preferably from 1 to 50 w/w %, and more preferably from 5 to 30 w/w %.

Odor Removal Treatment

With respect to an aqueous medium extract of a hop subjected to an oxidation treatment according to the present invention, it is preferable to conduct, according to need, an odor removal treatment for the purpose of reducing further an unpleasant odor of a hop subjected to an oxidation treatment or an extract thereof. When an odor removal treatment is conducted, the bitterness of a hop and an unpleasant odor, such as an odor of a fatty acid generated in a course of a heated ripening step for removing the bitterness, can be reduced remarkably, which is especially advantageous for ingesting pleasantly an aqueous medium extract, or imparting a flavor without impairing the original taste of a food and drink. An odor removal treatment step according to the present invention may be carried out before an extracting step or after the same insofar as a flavor improvement effect according to the present invention can be exhibited, and is preferably carried out after an extracting step.

There is no particular restriction on a technique for an odor removal treatment according to the present invention, insofar as an unpleasant odor can be removed, and examples of a technique to be applied include a heat treatment, a drying treatment, a deaeration treatment, a pressure reducing treatment, a pulverization treatment, and a combination thereof. More specific examples include boiling, reduced pressure deaeration, reduced pressure concentration, spray drying, freeze-drying, high temperature short time heating treatment, and high temperature short time sterilization. Application of the above treatment step is especially advantageous for removing an unpleasant odor of a hop subjected to an oxidation treatment. Further, it is an unexpected finding that an unpleasant odor can be selectively removed by applying a commonly used sterilization step for a beverage, such as a heat treatment, and a high temperature short time heating sterilization, to an aqueous medium extract of a hop subjected to an oxidation treatment. More specific conditions for an odor treatment may be determined appropriately by persons skilled in the art taking into consideration a flavor improvement effect to be obtained finally on an aqueous medium extract.

Other Components

As an aqueous medium extract of a hop subjected to an oxidation treatment according to the present invention, an aqueous medium extract of a hop subjected to an oxidation treatment obtained as above may be used as it is, but may contain also other additives hygienically permissible for a food.

There is no particular restriction on such other additives hygienically permissible for a food, and for example, a colorant, a preservative, a thickener, an antioxidant, an acidulant, an emulsifier, a reinforcing agent, a miscellaneous food additive, and a fragrance may be added appropriately.

An aqueous medium extract of a hop subjected to an oxidation treatment according to the present invention may be in any of a liquid form, a powder form, a granule form, etc.

Production method of Beverage/Others

The present invention can provide a beverage with an improved flavor by having a beverage contain an aqueous medium extract of a hop subjected to an oxidation treatment.

In a step for having a beverage contain an aqueous medium extract of a hop subjected to an oxidation treatment according to the present invention, the aqueous medium extract may be added to a final product of the beverage, added before a production method of the beverage, or after a production method of the beverage; and a production method of the beverage may include a heating step (for example, a boiling step). Meanwhile, an aqueous medium extract according to the present invention may be added during or just before ingestion to a beverage. Further, an aqueous medium extract according to the present invention may be added to a beverage dividedly in 2 or more times.

Further, an aqueous medium extract of a hop subjected to an oxidation treatment according to the present invention may be formed in a beverage by adding a hop subjected to an oxidation treatment to water or an aqueous beverage during production of the beverage. When an aqueous medium extract of a hop subjected to an oxidation treatment is formed in a beverage, an odor removing step may be applied to the beverage for the sake of further removal of an unpleasant odor.

As for a technique for having a beverage contain an aqueous medium extract according to the present invention, an aqueous medium extract according to the present invention may be added to a beverage, a beverage may be added to an aqueous medium extract according to the present invention, or a beverage and an aqueous medium extract according to the present invention may be mixed for use. Addition of a beverage to an aqueous medium extract according to the present invention includes, for example, an aspect in which a beverage is added to a container where an aqueous medium extract according to the present invention is already present.

There is no particular restriction on the kind of a beverage containing an aqueous medium extract according to the present invention, and a beverage may contain additionally a food source material, a flavoring, a flavor improving agent, etc. An appropriate example of a beverage according to the present invention is a water-based aqueous beverage, and specific examples include non-alcoholic beverages, such as a green tea drink, an oolong tea drink, a black tea drink, a fruit juice, a vegetable juice, a sports drink, an isotonic drink, a coffee drink, a carbonated drink, an energy drink, and a beauty care drink; and alcoholic beverages, such as wine, sake, ume liqueur, whiskey, brandy, Shochu (distilled spirit), rum, gin, and a liqueur. According to an aspect of the present invention, a beverage according to the present invention is in a form of a beverage filled in a container. Meanwhile, an aqueous medium extract according to the present invention may be applied to a food and drink other than an aqueous beverage, and the present invention includes such an aspect.

There is no particular restriction on the content of an aqueous medium extract according to the present invention in a beverage, which persons skilled in the art can decide appropriately according to the type and the character of a beverage. For example, the content of an aqueous medium extract of a hop subjected to an oxidation treatment per 1 mL of a beverage is preferably 0.01 mg or more based on reduced dry mass, more preferably from 0.05 to 2 mg, and further preferably from 0.1 to 1 mg.

An aqueous medium extract according to the present invention contains oxidized substances of an α acid, oxidized substances of an iso-α acid, and oxidized substances of a β acid, and the oxidized substances contain "tricyclo-isohumulone, etc.". In this regard, "tricyclo-isohumulone, etc." means a compound group including tricyclooxyisocohumulone (TCOIcoH: Formula 1), tricyclooxyisohumulone (TCOIH: Formula 2), and tricyclooxyisoadhumulone (TCOIadH: Formula 3). Herein, TCOIcoH, TCOIH, and TCOIadH are collectively called as "TCOIHs".

[Chem. Formula 1]

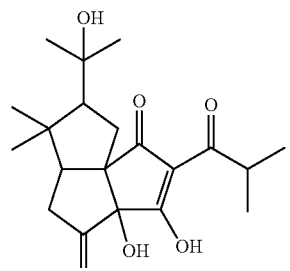

Formula 1

[Chem. Formula 2]

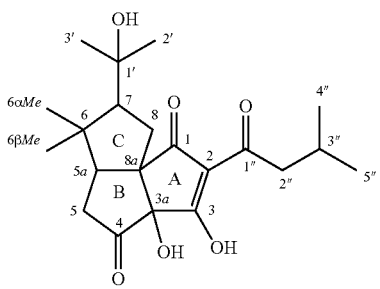

Formula 2

[Chem. Formula 3]

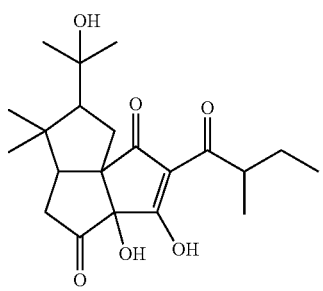

Formula 3

The total content of TCOIHs in oxidized substances of an α acid, oxidized substances of an iso-α acid, and oxidized substances of a β acid in an aqueous medium extract of an oxidation reaction product of a hop is, for example, from 0.1 to 50 w/w % based on dry weight, preferably from 0.5 to 30 w/w %, and more preferably from 1.5 to 20 w/w %.

There is no particular restriction on the content of TCOIHs according to the present invention in a beverage, which may be decided appropriately by persons skilled in the art according to the type and the character of a beverage. For example, the content in a beverage may be from 0.00825 to 44 ppm, preferably from 0.1 to 20 ppm, and more preferably from 0.4 to 16 ppm in order to improve the flavor of a beverage.

When an aqueous medium extract of a hop subjected to an oxidation treatment according to the present invention is added to a beverage, which needs a flavor improvement effect, the flavor thereof can be improved effectively as described above. Consequently, according to another aspect of the present invention, a flavor improving agent with an aqueous medium extract of a hop subjected to an oxidation treatment as an active ingredient is provided. Examples of a flavor improvement effect according to the present invention include impartment of briskness, impartment of luxuriousness, impartment of refreshing feel, impartment of feel of body, improvement of taste, improvement of aftertaste, and masking of heat sterilization odor. Therefore, according to an aspect, a flavor improving agent according to the present invention is an agent for briskness impartment, luxuriousness impartment, refreshing feel impartment, feel of body impartment, taste improvement, aftertaste improvement, and heat sterilization odor masking.

According to another aspect of the present invention, a method for producing a beverage with an improved flavor including a step for adding an aqueous medium extract according to the present invention to a beverage is provided.

According to another aspect of the present invention, an improvement method for a flavor of a beverage including a step for adding an aqueous medium extract according to the present invention to a beverage is provided.

According to still another aspect of the present invention, a use of an aqueous medium extract according to the present invention as a flavor improving agent for a beverage is provided.

A method for producing a beverage according to the present invention and a flavor improvement method according to the present invention can be implemented according to the above descriptions concerning a beverage according to the present invention.

In this connection, when another additive usable in a beverage is added to a beverage in addition to an aqueous medium extract of a hop subjected to an oxidation treatment, such another additive may be added to a beverage simultaneously with an aqueous medium extract, or added separately. Further, an aqueous medium extract may be mixed with another additive usable in a beverage, and then added to a beverage.

EXAMPLES

The present invention will be described specifically based on the following Examples, but is not limited to these Examples.

Example 1

Preparation and Analysis of Hop Subjected to Oxidation Treatment

A pellet-form Hallertau Perle (HPE Type) hop was subjected to a test. The hop was ground by a mill, and kept at 80° C. for a heating reaction time of 24 hours. The obtained product was pre-treated as follows, and then subjected to a HPLC analysis.

[Pretreatment of Reaction Product Before Analysis]

A harvested product was added to ethanol to 10% w/v, and allowed to be extracted at 50° C. for 1 hour. The obtained extract was diluted 10-fold with ethanol.

[Devices Constituting HPLC]

Pump: LC-10ADvp×3 (Shimadzu)
Degasser: DGU-20A5 (Shimadzu)
System controller: CBM-20A (Shimadzu)
Auto-sampler: SIL-20ACHT (Shimadzu)
Column oven: CTO-20AC (Shimadzu)
Photodiode array detector:SPD-M20A (Shimadzu)
Waveform analysis software: LCsolution (Shimadzu)

[HPLC Conditions]

Column: Alltima C18, 2.1 mm I.D.×100 mm, particle size 3 µm
Flow rate: 0.6 mL/min
Elution solvent A: water/phosphoric acid, 1000/0.2 (v/v), + EDTA (free) 0.02% (w/v)
Elution solvent B: acetonitrile
Elution solvent C: water
Injection amount: 3 µL
Column temperature: 40° C.
Detection wavelength: 270 nm (oxidation reaction product, iso-α acid, α acids, and β acid)
Gradient program:

TABLE 1

| Time min | Mobile phase composition % | | |
|---|---|---|---|
| | A | B | C |
| 0 | 90 | 10 | 0 |
| 26.67 | 48 | 52 | 0 |
| 30 | 25 | 75 | 0 |
| 32.67 | 15 | 85 | 0 |
| 37.67 | 15 | 85 | 0 |
| 37.68 | 0 | 10 | 90 |
| 41.3 | 0 | 10 | 90 |
| 41.31 | 90 | 10 | 0 |
| 51 | stop | | |

(After 37.68 min, a washing and equilibrating step)

With respect to all peaks detected at the detection wavelength of 270 nm under the above analysis conditions, the ratio (%) of peak areas of an α acid, a β acid, and an iso-α acid to the total area value (mAU·min) was calculated. On the occasion of a waveform analysis, a region, where a solvent peak or a negative peak due to an injection shock appears, is defined as an analysis exclusion region.

Figure 1B:
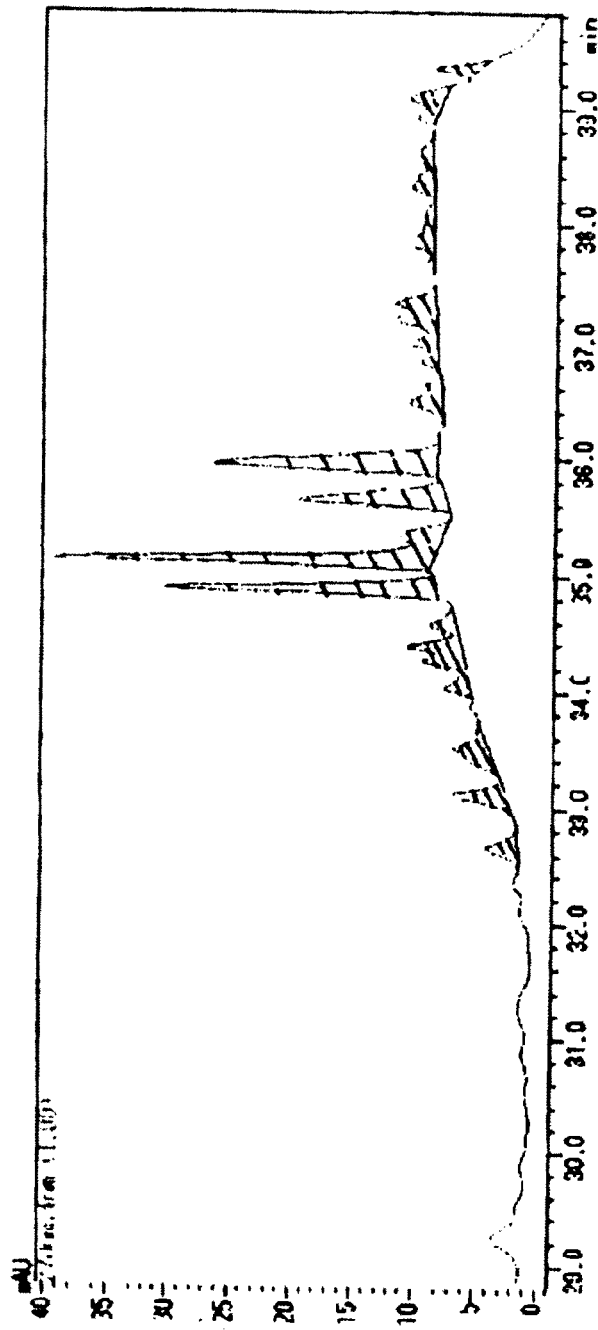
FIG. 1B is an enlarged view of a HPLC chart of a product obtained by an oxidation treatment of a hop (Example 1).

A HPLC chromatogram on the occasion of an analysis of the product of Example 1 is shown in FIG. 1A. FIG. 1B shows an enlarged view, in which the area relevant to the analysis after 30 min is depicted with hatching lines.

Figure 2A:
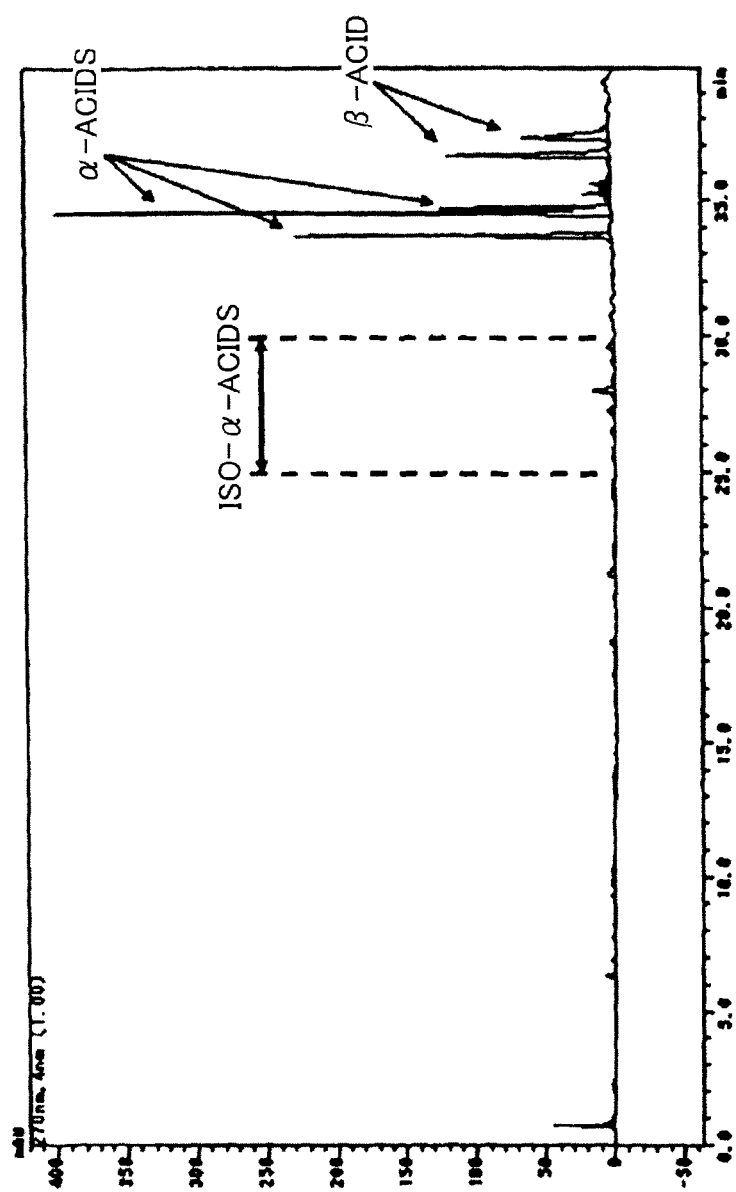
FIG. 2A is a HPLC chart of a hop which has not been subjected to an oxidation treatment.
Figure 2B:
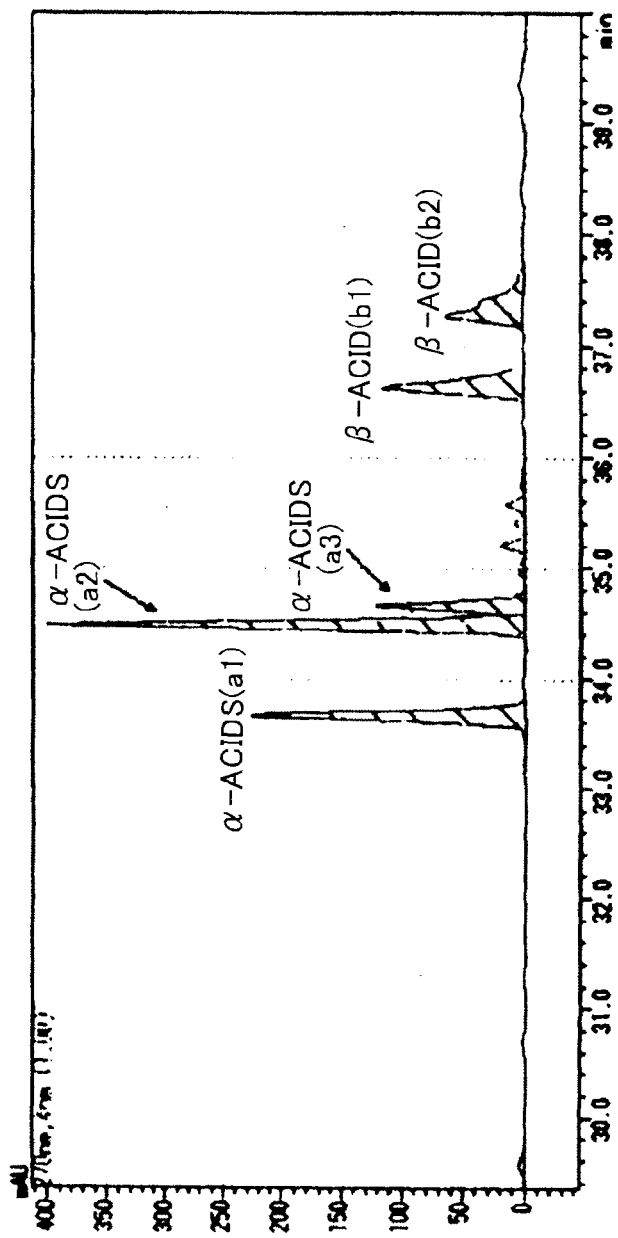
FIG. 2B is an enlarged view of a HPLC chart of a hop which has not been subjected to an oxidation treatment.

A chromatogram on the occasion of an analysis for a case where an oxidation treatment was not performed is shown in FIG. 2A. FIG. 2B shows an enlarged view. With respect to peaks of α acids, and β acids, the retention times of α acids (a1, a2, a3), and β acids (b1, b2) at this analysis were used as reference values. In this regard, a1, a2, and a3 are in this order cohumulone, humulone, and adhumulone; and b1, and b2 are respectively colupulone, lupulone and adlupulone.

With respect to all peaks detected at the detection wavelength of 270 nm in each analysis sample, the ratio (%) of peak areas (mAU·min) of an α acid, a β acid, and an iso-α acid to the total area value was as in Table 2.

TABLE 2

| Reaction conditions | Peak area ratio (%)<br>(α acid, β acid, iso-α acid/all peaks) |
|---|---|
| 80° C., 24 hours | 3.0 |
| Untreated | 88.9 |

As obvious from the results, in the product obtained by an oxidation treatment, the ratio of α acid, β acid, and iso-α acid to the total peaks has decreased considerably, and α acids, β acids, and iso-α acids have decreased from an untreated sample by approx. 90%.

Further, new peaks other than α acid, β acid, and iso-α acid (oxidation reaction products of a hop) have appeared by an oxidation reaction. Namely, peaks in ranges distinguished by arrows A1 and A2 in FIG. 1A corresponding to the new peaks (excluding peaks of α acid, and β acid). With respect to all peaks detected at the detection wavelength of 270 nm, the ratio (%) of areas (mAU·min) of the peaks in the ranges distinguished by the arrows A1 and A2 (excluding peaks of α acid, and β acid) to the total area value was as in Table 3.

The peak area in the ranges distinguished by the arrows A is a sum of a peak area A1 from a retention time of 3 min to 25 min, and a peak area A2 from a retention time of 32 min to 39 min (excluding peaks of α acid, and β acid). In this regard, "to a retention time of 25 min" with respect to A1 means "until a peak identified as trans-isocohumulone appears".

In the range distinguished by the arrow A1 on the left in FIG. 1, characteristic peaks were recognized near a retention time of 9.7 min, near a retention time of 11.8 min, and near a retention time of 12.3 min.

Further, in the range distinguished by the arrow A2 on the right in FIG. 1A, shoulder peaks were recognized, having the initial point near a retention time of 32 min, and the end point near a retention time of 39 min, and the top point (excluding peaks of α acid, and β acid) was near a retention time of 35 min to 36 min.

TABLE 3-1

| Reaction conditions | Peak area ratio (%)<br>(Peaks in ranges distinguished by<br>arrows A1, A2/all peaks) |
|---|---|
| 80° C., 24 hours | 97.0 |
| Untreated | 11.1 |

In this case, the area ratio (%) of peaks in the range distinguished by the arrow A1 to all peaks was 78.0%.

By the analysis method, an α acid, a β acid, and an iso-α acid contained in a hop or in the product can be quantitatively analyzed. As standard materials for a quantitative analysis with respect to an α acid, a β acid, and an iso-α acid, for example, Internal Calibration Standards ICE-2, ICS-I2, and ICS-T2 available from American Society of Brewing Chemists (ASBC) can be applied.

Quantitative Analysis of Oxidized Substances of a Acid, iso-α Acid, and β Acid in Oxidation Reaction Product of Hop Further, oxidized substance components of α acid, iso-α acid, and β acid contained in an oxidation reaction product of a hop were analyzed quantitatively by the analysis method. Specifically, from the total peak area in the range distinguished by the arrow A1 in FIG. 1A the amount of the above components was calculated as a quantitative value reduced to iso-α acid.

The oxidized substances of α acid, iso-α acid, and β acid in an extract of an oxidation reaction product of a hop were analyzed quantitatively by the HPLC analysis after pretreating a sample under the pretreatment conditions described below.

Quantitative Analysis of TCOIHs in Oxidation Reaction Product of Hop From an oxidation reaction product of a hop, TCOIHs can be isolated and purified by a publicly known fractionation technique such as chromatography.

By a technique, such as HPLC and LC-MS, TCOIHs in an oxidation reaction product of a hop or an extract thereof, and a beverage containing the extract can be analyzed quantitatively using an isolated and purified TCOIH as a standard. An example of an analysis of TCOIHs in an oxidation reaction product of a hop will be shown below.

[HPLC Conditions]
Column: L-column2, 2.1 mm I.D.×150 mm, particle size 3 μm
Flow rate: 0.375 mL/min
Elution solvent A: 5 mM ammonium formate (pH 8.5)
Elution solvent B: acetonitrile
Injection amount: 3 μL
Column temperature: 40° C.
Detection wavelength: 270 nm
Gradient program:

TABLE 3-2

| Time min | % B |
|---|---|
| 0 | 10 |
| 39 | 36 |
| 44 | 80 |
| 52 | 80 |
| 53 | 10 |
| 61 | STOP |

Figure 3:
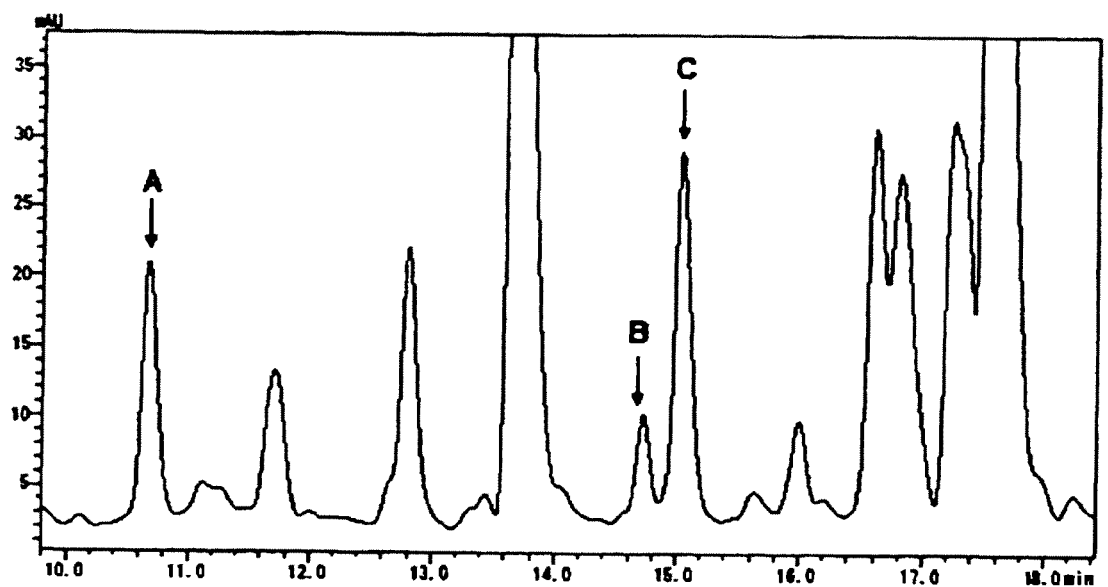
FIG. 3 is an enlarged view of a HPLC chart of a product obtained by an oxidation treatment of a hop. A corresponds to tricyclooxyisocohumulone, B corresponds to tricyclooxyisoadhumulone, and C corresponds to tricyclooxyisohumulone.

FIG. 3 shows an analysis result of an oxidation reaction product of a hop obtained by an oxidation treatment of a hop at 60° C. for 120 hours. A in FIG. 3 corresponds to TCOIcoH, B to TCOIadH, and C to TCOIH.

Analyses of Oxidized Substances of α Acid, iso-α Acid, and β Acid and TCOIHs in Beverage and Extract of Oxidation Reaction Product of Hop

[Pretreatment Method, etc.]

An extract of an oxidation reaction product of a hop was dissolved or suspended in water. Next, hydrochloric acid was added to a concentration of hydrochloric acid in an aqueous solution of 0.1 N to lower the pH, and oxidized substances of an α acid, an iso-α acid, and a β acid were extracted with dichloromethane in a volume 2-fold as much as a water layer. Next, the dichloromethane extract was collected, dichloromethane was evaporated in a nitrogen stream to replace the solvent with ethanol, and the liquid was subjected to a HPLC analysis.

A quantitative value of oxidized substances of an α acid, an iso-α acid, and a β acid in an extract of an oxidation reaction product of a hop was determined by a method similar to the quantitative analysis method described above for oxidized substances of an α acid, an iso-α acid, and a β acid in an oxidation reaction product of a hop. Oxidized substances of an α acid, an iso-α acid, and a β acid in a beverage, to which an extract of oxidation reaction products of a hop was added, were measured also by the method. With respect to TCOIHs in an extract of an oxidation reaction product of a hop and in a beverage, to which an extract of an oxidation reaction product of a hop was added, a quantitative analysis was made after a pretreatment by a similar method, and by a HPLC analysis according to the quantitative analysis method described above for TCOIHs in an oxidation reaction product of a hop.

Although the amount of TCOIHs with respect to the amount of oxidized substances of an α acid, an iso-α acid, and a β acid in an extract of an oxidation reaction product of a hop fluctuated depending on the kind of a hop for preparing an oxidation reaction product, the oxidation condition, and the extraction condition for an extract, it was approximately in a range from 1.5 to 20 mass-%.

Example 2

Preparation and Analysis of Flavor Improving Agent (Aqueous Medium Extract of Hop Subjected to Oxidation Treatment)

2-1: Analysis of Aqueous Medium Extract

By maintaining a heating reaction time at 60° C. for 120 hours on the hop used in Example 1, a hop subjected to an oxidation treatment was obtained. The obtained product was added to water to 10% w/v, and left for extraction at 50° C. for 1 hour. The obtained extract in an amount of 1 L was spray-dried with a spray dryer (B-290, made by Nihon BUCHI K.K.) under conditions of the inlet temperature from 165 to 175° C., the outlet temperature from 80 to 100° C., and the liquid supply rate of 2 mL/min to obtain 25 g of powder. Water was added to 1 g of the obtained powder adjusting to 500 g, which was then analyzed by HPLC according to the method in Example 1. The peak area ratio 1, which was the ratio of the total peak area of α acid, β acid, and iso-α acid to the area of all peaks, and the peak area ratio 2, which was the ratio of the peak area of components other than α acid, β acid, and iso-α acid (areas in ranges distinguished by arrows A1, A2 in FIG. 1A) to the area of all peaks, were calculated.

The ratio (%) of peak area (mAU·min) of an α acid, a β acid, and an iso-α acid to the total area of all peaks detected at the detection wavelength of 270 nm in an analysis sample was 2%. The ratio of area of peaks (%) in the ranges distinguished by arrows A1, A2 in FIG. 1A (excluding peaks of αacid and β acid) was 98%. Namely, a water extract containing oxidized substances of an α acid, an iso-α acid, and a β acid of an oxidation reaction product of a hop at 90% or more expressed as a peak area ratio (%) was produced.

The concentration of oxidized substances of an α acid, an iso-α acid, and a β acid in an analysis sample, namely a water extract of an oxidation reaction product of a hop was calculated to find 220 ppm as reduced to an iso-α acid. The concentration of oxidized substances of an α acid, an iso-α acid, and a β acid of an oxidation reaction product of a hop in a powder of a water extract was 11 w/w %.

2-2: Analysis of Hop Itself Subjected to Oxidation Treatment (Oxidation Reaction Product of Hop)

A hop subjected to an oxidation treatment (an oxidation reaction product of a hop) obtained in 2-1 was pretreated and subjected to a HPLC analysis according to the method described in Example 1. Next, the peak area ratio 1, which was the ratio of the total peak area of α acid, β acid, and iso-α acid to the area of all peaks, and the peak area ratio 2, which was the ratio of the peak area of components other than α acid, β acid, and iso-α acid (areas in ranges distinguished by arrows A1, A2 in FIG. 1A) to the area of all peaks, were calculated. The ratio (%) of peak area (mAU·min) of an α acid, a β acid, and an iso-α acid to the total area of all peaks detected at the detection wavelength of 270 nm in an analysis sample was 8.0%. The ratio of area of peaks (%) in the ranges distinguished by arrows A1, A2 in FIG. 1A (excluding peaks of α acid and β acid) was 92.0%.

Example 3

Extraction Test of Hop Subjected to Oxidation Treatment with Aqueous Medium

A hop subjected to an oxidation treatment obtained in Example 2 was extracted with water, and the flavor (bitterness, unpleasant odor) of the obtained aqueous medium extract was evaluated according to the following test method.

(Test Method)
(1) To hot water regulated in terms of pH (4, 7, and 9) and temperature (20 to 100° C.), a hop subjected to an oxidation treatment was added to 0.4 to 10% w/v, and extracted for 30 sec to 150 min. Then, the extract was filtrated to remove an extraction residue to obtain the aqueous medium extract.
(2) Each aqueous medium extract was diluted with water to a concentration corresponding to 0.1% w/v of a hop subjected to an oxidation treatment, and the bitterness and unpleasant odor of the diluted extract solution were evaluated by 4 panelists according to the evaluation criteria shown in Table 4.

TABLE 4

| [Evaluation Criteria] | | |
|---|---|---|
| Evaluation item | Evaluation criteria | Score |
| Bitterness | Substantially no feel of bitterness | ◯ |
|  | Slight feel of bitterness | Δ |
|  | Strong feel of bitterness | X |
| Unpleasant odor | No unpleasant odor | ⊚ |
|  | Substantially no unpleasant odor | ◯ |
|  | Slight feel of unpleasant odor | Δ |
|  | Strong feel of unpleasant odor | X |

The results were as shown in Table 5. By extraction under an acidic or neutral condition, an aqueous medium extract of a hop subjected to an oxidation treatment without a problem in terms of bitterness could be obtained. It has been confirmed that, by extraction especially at a low temperature for a short time period, a flavor tends to become favorable.

TABLE 5

| Solution pH | Extraction temperature | Content of hop subjected to oxidation treatment % w/v | Extraction time | Sensory evaluation score | |
|---|---|---|---|---|---|
|  |  |  |  | Bitterness | Unpleasant odor |
| pH 4 | 60° C. | 0.4 | 30 sec | ◯ | Δ |
|  |  | 0.4 | 1 min | ◯ | Δ |
|  |  | 0.4 | 5 min | Δ | Δ |
|  | 75° C. | 0.4 | 30 sec | ◯ | Δ |
|  |  | 0.4 | 1 min | Δ | X |
|  |  | 0.4 | 5 min | Δ | X |
| pH 7 | 20° C. | 0.4 | 10 min | ◯ | ◯ |
|  |  | 10.0 | 10 min | ◯ | ◯ |
|  | 50° C. | 0.4 | 10 min | Δ | X |
|  |  | 10.0 | 10 min | ◯ | Δ |
|  | 60° C. | 0.4 | 30 sec | ◯ | Δ |
|  |  | 0.4 | 1 min | ◯ | Δ |
|  |  | 0.4 | 5 min | Δ | Δ |

TABLE 5-continued

| Extraction | | | | Sensory evaluation score | |
|---|---|---|---|---|---|
| Solution pH | temper- ature | Content of hop subjected to oxidation treatment % w/v | Extraction time | Bitter- ness | Unpleasant odor |
| | 75° C. | 0.4 | 30 sec | ○ | Δ |
| | | 0.4 | 1 min | Δ | X |
| | | 0.4 | 5 min | Δ | X |
| | 80° C. | 10.0 | 5 min | Δ | Δ |
| pH 9 | 60° C. | 0.4 | 5 min | Δ | X |

In addition to those shown in Table 5, the temperature condition was investigated according to the above test method. As the result, under either an acidic (pH 4) or a neutral (pH 7) condition, a problem-free aqueous medium extract of a hop subjected to an oxidation treatment in terms of bitterness could be obtained below 90° C. Under an alkaline (pH 9) condition, a problem-free aqueous medium extract of a hop subjected to an oxidation treatment in terms of bitterness could be obtained below 75° C.

Example 4

Odor Removal Treatment for Aqueous Medium Extract of Hop Subjected to Oxidation Treatment A method of odor removal from an aqueous medium extract of a hop subjected to an oxidation treatment was investigated according to the following test method.
(Test Method)
(1) A hop subjected to an oxidation treatment, which was prepared in Example 2, was added into hot water (pH 7, 50° C.) to 10% w/v with respect to the water weight, and extracted for 10 min. Then, the extract was filtrated to remove an extraction residue, and a water extract was obtained.
(2) The water extract was processed by any one of the following treatments a to f. An extract having undergone a concentration and pulverization step was adjusted to the concentration before the processing treatment by adding water. Specific procedures of processing treatments are as follows.
a. Boiling: A container into which the water extract was charged was heated under an atmospheric pressure allowing the water extract to boil for 10 min.
b. Reduced pressure deaeration: The water extract was deaerated at a reduced pressure of 50 mmHg for 60 min using a vacuum pump (Model DOA-P704-AA, made by Gast Manufacturing, Inc.).
c. Reduced pressure concentration: The water extract was concentrated at 45° C. for 60 to 120 min using a rotary evaporator (Model N-1000, made by Tokyo Rikakikai Co., Ltd.).
d. Spray drying: The water extract was spray-dried using a spray dryer (B-290, made by Nihon BUCHI K.K.) under conditions of the inlet temperature of 165 to 175° C., the outlet temperature of 80-100° C., the liquid feed rate of 2 mL/min.
e. Freeze-drying: The water extract was freeze-dried using a freeze-dryer (RLEII-206, made by Kyowa Vacuum Engineering Co., Ltd.) at a shelf temperature of 20 to 30° C. over 40 to 50 hours.
f. High-temperature short-time heat treatment: A liquid prepared by diluting 50 mL of the water extract with water to 5000 mL (equivalent to a 0.1% diluted solution of a hop subjected to an oxidation treatment) was heat-treated with a tube UHT sterilizer (made by MicroThermics, Inc.) under conditions corresponding to 130 to 140° C. for 30 sec.
(3) Each extract undergone a processing treatment was diluted with water to a concentration equivalent to 0.1% w/v of a hop subjected to an oxidation treatment, the diluted solution of an extract undergone a processing treatment was evaluated by 4 panelists in terms of bitterness and unpleasant odor according to the evaluation criteria set forth in Table 4.

The results were as shown in Table 6.

TABLE 6

| Processing treatment method | Sensory evaluation score | |
|---|---|---|
| | Bitterness | Unpleasant odor |
| Untreated | Δ | X |
| Boiling | Δ | ○ |
| Reduced pressure deaeration | Δ | ○ |
| Reduced pressure concentration | Δ | ○ |
| Spray drying | Δ | ⊚ |
| Freeze-drying | Δ | ⊚ |
| High-temperature short-time heat treatment | Δ | ○ |

In a case where an aqueous medium extract of a hop subjected to an oxidation treatment was subjected to a heating, pressure reducing or drying step, an unpleasant odor was selectively removed in comparison to an untreated extract.

Example 5

Flavor Evaluation of Tea Drink Containing Aqueous Medium Extract of Hop Subjected to Oxidation Treatment A tea drink containing an aqueous medium extract of a hop subjected to an oxidation treatment was evaluated in terms of flavor according to the following test method.
(Test Method)
(1) Oolong leaf 50 g was extracted with 1500 g of hot water for 5 min. Halfway, 5.5 g of a hop subjected to an oxidation treatment obtained in Example 2 was added, and extracted together. The conditions for extraction and addition are described in Table 7.

TABLE 7

| No. | Extraction temperature (° C.) | Addition timing of hop subjected to oxidation treatment |
|---|---|---|
| 1 | 75 | No addition |
| 2 | 75 | 4 min after initiation of extraction (1-min extraction) |
| 3 | 60 | 3 min after initiation of extraction (2-min extraction) |

(2) The extract was filtrated to remove an extraction residue, then diluted with water to 5000 g, and subjected to a UHT sterilization treatment to prepare a tea drink.
(3) The flavor (bitterness, unpleasant odor, and feel of tea) of the tea drink was evaluated by 7 panelists according to the evaluation criteria set forth in Table 8.

TABLE 8

| Evaluation item | Evaluation criteria | Score |
| --- | --- | --- |
| Bitterness | Bitterness allowing pleasant ingestion | ○ |
| | Bitterness making pleasant ingestion difficult | Δ |
| | Bitterness not permissible for tea drink | X |
| Unpleasant odor | Substantially no unpleasant odor | ○ |
| | Slight feel of unpleasant odor | Δ |
| | Strong feel of unpleasant odor | X |

(4) Presence of an oxidation reaction product of a hop was detected by subjecting a tea drink to a HPLC analysis under the conditions described in Example 1.

In a HPLC chart, characteristic peaks are recognized in the same range distinguished by the arrow A1 in FIG. 1A near the same retention times as in FIG. 1A, to confirm presence of an oxidation reaction product of a hop in a tea drink.

In this connection, the characteristic peak near the same retention time as in FIG. 1A is a peak corresponding to an oxidized substance of an α acid, an oxidized substance of an iso-α acid, or an oxidized substances of a β acid.

The results of the sensory evaluation were as shown in Table 9.

When oolong leaves and an oxidation reaction product of a hop were extracted simultaneously and subjected to a UHT sterilization treatment, an unpleasant odor was removed, and a tea drink containing an aqueous medium extract of a hop subjected to an oxidation treatment without drawback in flavor (slight or no feel of bitterness) was obtained.

Meanwhile, it was confirmed that the bitterness tends to become mild, when extraction is carried out at a low temperature.

It was confirmed that by adding to oolong an aqueous medium extract of a hop subjected to an oxidation treatment, a refreshing green aroma recalling a high grade oolong was imparted without using a fragrance.

TABLE 9

| Formulation No. | Sensory evaluation | | Feeling in drinking |
| --- | --- | --- | --- |
| | Bitterness | Unpleasant odor | |
| 1 | ○ | ○ | General oolong flavor |
| 2 | Δ | ○ | Refreshing green aroma recalling high grade oolong, some feel of bitterness |
| 3 | ○ | ○ | Refreshing green aroma recalling high grade oolong |

Example 6

Flavor Improvement Effect on Beverage by Addition of Hop Subjected to Oxidation Treatment The flavor of a beverage, to which a water extract of a hop subjected to an oxidation treatment was added, was evaluated according to the following test method.

(Test Method)
(1) A powder of the flavor improving agent obtained in Example 2 was added to a green tea, a sugarless black tea, a coffee, and an acidic beverage. The contents with respect to the powder were 0.005 w/w %, 0.02 w/w %, 0.08 w/w %, and 0.2 w/w % respectively.

(2) Each of the prepared drinks underwent a sensory evaluation by 4 well-trained panelists.

The results of the sensory evaluation were as shown in Table 10. By addition of the flavor improving agent obtained in Example 2, such characters as "an aftertaste and a deep flavor are intensified", "an accent is imparted", and "a high grade flavor is imparted" were confirmed.

TABLE 10

| | Content of flavor improving agent | Flavor evaluation |
| --- | --- | --- |
| Green tea | 0.005% | Richness of aftertaste is intensified and a feel of tea is enhanced. |
| | 0.02% | Richness and depth of aftertaste are intensified. |
| | 0.08% | High quality astringency is imparted. |
| | 0.2% | Bitterness and astringency are increased. |
| Sugarless black tea | 0.005% | Fresh feel of black tea is intensified. |
| | 0.02% | Richness of aftertaste is intensified and a feel of tea is enhanced. |
| | 0.08% | High quality astringency is imparted. |
| | 0.2% | Bitterness and astringency are increased. |
| Coffee | 0.005% | Deep flavor is intensified. |
| | 0.02% | Lingering aftertaste is increased to impart flavor with accent. |
| | 0.08% | Aftertaste and richness is imparted, as if deep roasted beans were used. |
| | 0.2% | Aftertaste and richness is imparted, as if deep roasted beans were used. |
| Saccharide solution | 0.005% | Lingering sweetness becomes mild, and flavor with accent is obtained. |
| | 0.02% | Mild astringency as citrus is imparted. |
| | 0.08% | Astringency is increased. |
| | 0.2% | Bitterness and astringency are increased. |

Example 7

Analyses of TCOIH as Components for Oxidized Substances of α Acid, Iso-α Acid, and β Acid Originated from Aqueous Medium Extract of Oxidation Reaction Product of Hop According to the description in Example 1, TCOIHs were isolated and purified from an oxidation reaction product of a hop by a fractionation technique such as chromatography. It was confirmed that as components of oxidized components of an α acid, an iso-α acid, and a β acid in an oxidation reaction product of a hop or an aqueous medium extract thereof, tricyclooxyisocohumulone (TCOIcoH: Formula 1), tricyclooxyisohumulone (TCOIH: Formula 2), and tricyclooxyisoadhumulone (TCOIadH: Formula 3) expressed by the following formulas were included.

[Chem. Formula 4]

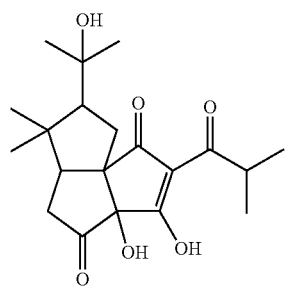

Formula 1

-continued

[Chem. Formula 5]

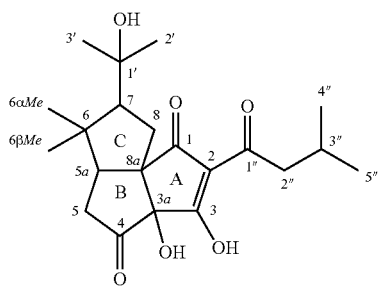

Formula 2

[Chem. Formula 6]

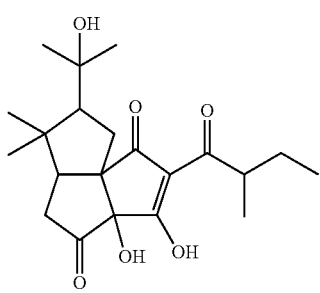

Formula 3

Meanwhile, as a result of an accurate mass analysis (m/z 377.1964 [M-H]-, calcd. for $C_{21}H_{29}O_6$, 377.1970) of TCOIH isolated from TCOIHs, the molecule formula of TCOIH was presumed as $C_{21}H_{30}O_6$.

Further, results of 1H-NMR of TCOIH were as in Table 11. Further, from results of a 13C-NMR measurement and various two-dimensional NMR measurements of TCOIH, the planar structure of TCOIH was determined.

TABLE 11

| 1H NMR (400 MHz, CD$_3$OD), 13C-NMR (100 MHz, CD$_3$OD) | | |
|---|---|---|
| position | 1H | 13C |
| 1 | — | 208.3 |
| 2 | — | 111.9 |
| 3 | — | 196.7 |
| 3a | — | 86.0 |
| 4 | — | 213.3 |
| 5 | 2.42 (1H, dd, J = 18.0, 9.2 Hz), 2.22 (1H, d, J = 18.0 Hz) | 36.2 |
| 5a | 2.49 (1H, dd, J = 9.2 Hz) | 56.3 |
| 6 | — | 46.3 |
| 6αMe | 0.72 (3H, s) | 17.5 |
| 6βMe | 1.16 (3H, s) | 29.5 |
| 7 | 2.09 (1H, m) | 61.7 |
| 8 | 2.32 (1H, dd, J = 13.0, 13.0 Hz), 1.98 (1H, dd, J = 13.0, 7.2 Hz) | 30.7 |
| 8a | — | 59.4 |
| 1' | — | 73.3 |
| 2' | 1.31 (3H, s) | 30.3 |
| 3' | 1.27 (3H, s) | 30.6 |
| 1" | — | 201.5 |

TABLE 11-continued

| 1H NMR (400 MHz, CD$_3$OD), 13C-NMR (100 MHz, CD$_3$OD) | | |
|---|---|---|
| position | 1H | 13C |
| 2" | 2.76 (1H, dd, J = 14.6, 6.7 Hz) 2.72 (1H, dd, J = 14.6, 7.0 Hz) | 48.6 |
| 3" | 2.11 (1H, m) | 26.6 |
| 4" | 0.94 (3H, d, J = 6.6 Hz) | 23.0 |
| 5" | 0.94 (3H, d, J = 6.6 Hz) | 22.9 |

From chemical shift values of 6αMe and 6βMe groups, and measurement results of NOESY, with respect to the relative configuration of a ring C, it was suggested that the 1-hydroxy-1-methylethyl group at position 7 was in an β arrangement as shown in Formula 4.

[Chem. Formula 7]

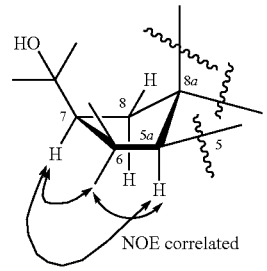

Formula 4

Example 8

Flavor Improvement Effect on TCOIHs in Water Extract of Hop Subjected to Oxidation Treatment and on Beverage The concentration of TCOIHs in the powder of the flavor improving agent used in Example 6 was measured to find that 0.8 w/w % was included. In other words the content of TCOIHs in a beverage, on which a flavor improvement effect was confirmed in Example 6, was 0.4 to 16 ppm.

Consequently, it has become clear that a flavor improvement effect on a green tea, a sugarless black tea, a coffee, and an acidic beverage can be obtained at least in the content range.

The invention claimed is:

1. A beverage comprising tricyclooxyisocohumulone, tricyclooxyisohumulone, tricyclooxyisoadhumulone, and an aqueous medium, wherein the total content of tricyclooxyisocohumulone, tricyclooxyisohumulone, and tricyclooxyisoadhumulone in the beverage is from 0.4 to 16 ppm, wherein the beverage is selected from the group consisting of green tea, black tea, and coffee.

2. The beverage according to claim 1, which is subjected to an odor removal treatment.

3. The beverage according to claim 1, wherein the tricyclooxyisohumulone is 7β-tricyclooxyisohumulone.

* * * * *